United States Patent [19]

Baerveldt

[11] Patent Number: 5,584,152
[45] Date of Patent: *Dec. 17, 1996

[54] JOINT SEAL RETAINING ELEMENT

[76] Inventor: Konrad Baerveldt, 5 Rosea Court, Thornhill, Ontario, Canada, L3T 2V3

[*] Notice: The term of this patent shall not extend beyond the expiration date of Pat. No. 5,213,441.

[21] Appl. No.: 213,856

[22] Filed: Mar. 16, 1994

[30] Foreign Application Priority Data

Mar. 18, 1993 [CA] Canada ................................. 2091948

[51] Int. Cl.⁶ ................................................. E01C 11/10
[52] U.S. Cl. ..................... 52/396.05; 52/396.04; 404/67; 404/69
[58] Field of Search ......................... 52/393, 395, 396.04, 52/396.05, 396.06, 396.07, 402, 396.08, 396.09; 404/66, 67, 68, 69

[56] References Cited

U.S. PATENT DOCUMENTS

| 3,363,522 | 1/1968 | Galbreath . | |
|---|---|---|---|
| 3,713,368 | 1/1973 | McDowell . | |
| 3,750,359 | 8/1973 | Balzer et al. . | |
| 3,880,539 | 4/1975 | Brown | 404/68 X |
| 3,981,601 | 9/1976 | Arai | 404/68 |
| 4,084,912 | 4/1978 | Pyle et al. . | |
| 4,125,581 | 11/1978 | Rasmussen . | |
| 4,307,974 | 12/1981 | George | 52/396.04 X |
| 4,415,519 | 11/1983 | Strassel . | |
| 4,504,170 | 3/1985 | Schukolinski . | |
| 4,572,702 | 2/1986 | Bone . | |
| 4,690,862 | 9/1987 | Hoffmann . | |
| 4,774,795 | 10/1988 | Braun . | |
| 4,815,247 | 3/1989 | Nicholas . | |
| 5,048,249 | 9/1991 | Shreiner et al. | 52/396.07 |
| 5,137,675 | 8/1992 | Rabe . | |
| 5,183,613 | 2/1993 | Edwards . | |
| 5,213,441 | 5/1993 | Baerveldt . | |

FOREIGN PATENT DOCUMENTS

| 474929 | 7/1974 | Australia | 404/69 |
|---|---|---|---|
| 2570460 | 3/1986 | France | 52/396.04 |

Primary Examiner—Kevin D. Wilkens
Attorney, Agent, or Firm—Baker & Daniels

[57] ABSTRACT

A method of manufacturing a retaining element for an expansion joint seal comprises co-extruding, in a desired profile, a thermoplastic rubber body with high density thermoplastic elastomer reinforcing plate on the lower surface thereof. The reinforcing plate includes at least one rib extending into the thermoplastic rubber body. After the co-extruded body and reinforcing plate are permitted to cool and harden the lower surface of said co-extruded body and reinforcing plate is mechanically planed to obtain a retaining element of said desired profile with a flat lower surface.

5 Claims, 1 Drawing Sheet

5,584,152

JOINT SEAL RETAINING ELEMENT

The present invention relates to the field of expansion joints, such as those utilized in parking deck structures, elevated runways, bridges and the like.

An expansion joint is a joint that is cut or formed in a surface, particularly a concrete surface, to allow for natural thermal expansion and other flexural movements of a structural or groundwork element, without causing cracking or disintegration of same. After the joint is cut or formed, to prevent it from filling up with dirt, debris, water, snow, ice, or other material, an expandable joint seal is anchored to each side of the joint, in channels known as 'blockouts', that are specially cut or formed in the edges of the joint. The joint seal is anchored to the sides of the joint by a joint seal retaining element. Conventionally, these elements have been manufactured from moulded artificial rubber materials, such as polychloroprene NEOPRENE®. To provide rigidity and strength and more especially an ability to bolt down and torque or otherwise fasten these elements onto a concrete deck, steel or other metallic plates have been moulded directly into the retaining element. It will be understood that such a conventional retaining element is functional, but does have drawbacks. It must be moulded, not extruded, because of the metal plate inside it. Moreover, it is manufactured in predetermined sizes, and therefore it is difficult to custom fit for many installations. In some instances, then, joint dimensions, especially length, will be compromised by the availability of appropriate lengths of moulded retaining elements.

To overcome the drawbacks noted above, joint retaining elements have been developed by the applicant, such as those described in copending U.S. application Ser. No. 689,337 filed Apr. 22, 1991, in the name of the present inventor. Such an improved retaining element utilizes an extruded thermoplastic rubber body, co-extruded with a very high density polyethylene elastomer or polypropylene elastomer reinforcement plate along its lowermost surface. Moreover, the co-extruded retaining elements described in that application, which is incorporated herein by reference, may be custom cut and heat welded together, in the shop or field, whereby they have shown remarkable versatility of application.

The joint retaining element of the present invention are similar in their general nature to those of the applicant's above-noted application, but are an improvement thereon.

In particular, it was felt that there was a need to provide stronger retaining elements, with superior rigidity, but with the advantages possessed by those of applicant's above-noted previous invention. In order to accomplish this, the present invention provides a co-extruded high density (or ultra-high density) polyethylene elastomer or polypropylene elastomer reinforcement plate that has a plurality of upwardly extending ribs. Such ribs provide superior rigidity and strength, and permit a retaining element to be torqued down more securely.

A severe problem that was encountered in the development of a ribbed co-extruded reinforcement plate was that the reinforcement plate, because it is co-extruded from a thermo plastic of different density and thermal properties than the surrounding rubber body, tended to deform and produce irregular ridges on the lower surface of the retaining element. This condition renders a retaining element unusable, since it must have a very flat, rigid lower surface. The solution to this problem that has been developed by the applicant is post-extrusion planing of the extruded element. Post-extrusion planing, as developed by the applicant, permits the co-extrusion of a high or ultra-high density polyethylene polymer or polypropylene polymer, ribbed reinforcement plate even though it deforms and produces unacceptable ridges after co-extrusion. These ridges are, according to the present invention, planed off.

An object of the present invention, therefore, is to provide an improved co-extruded expansion joint retaining element.

In a broad aspect, the present invention relates to a method or methods of manufacturing a retaining element for an expansion joint seal comprising co-extruding, in a desired profile, a thermoplastic rubber body with high density thermoplastic reinforcing plate on the lower surface thereof, said reinforcing plate including at least one rib extending into said thermoplastic rubber body; permitting said co-extruded body and reinforcing plate to cool and harden; and mechanically planing the lower surface of said co-extruded body and reinforcing plate to obtain a retaining element of said desired profile with a flat lower surface.

In another broad aspect, the present invention relates to an apparatus for spanning and sealing an expansion joint between two load bearing surfaces, said joint being a gap between two said surfaces these being formed in said surfaces adjacent said gap substantially rectangular channels open upwardly and to said gap, said apparatus comprising: (a) an elongated joint seal member having a central body portion dimensioned to span said gap, and a pair of side flap members extending therefrom of a width selected to lay flat in said channels; (b) upwardly extending darts near the outermost edges of said flap members; (c) a pair of joint seal retaining members, of a width selected to overlie said flap members, said retaining members being provided with elongate channels on their lower surface to accept said upwardly extending darts on said flap members.

In drawings that illustrate the present invention by way of example:

Figure 1:
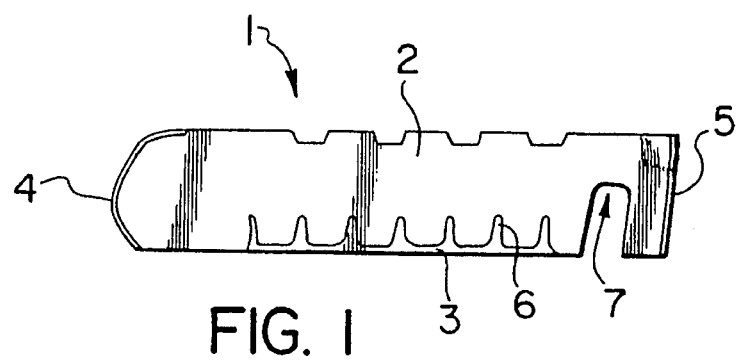
FIG. 1 is a cross-sectional view of a joint seal retaining member according to the present invention, after planing.
Figure 2:
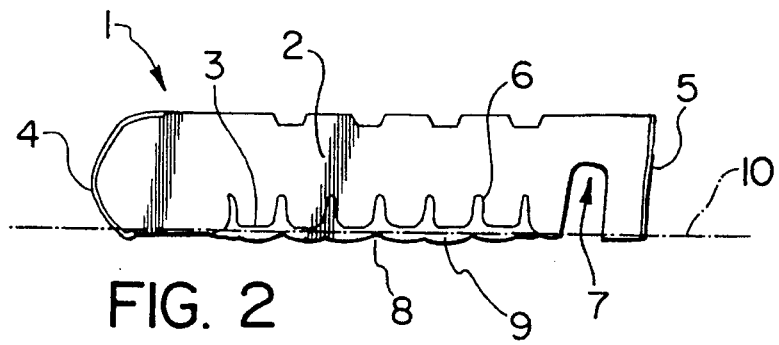
FIG. 2 is across-sectional view of a joint seal retaining member according to the present invention, prior to planing.
Figure 3:
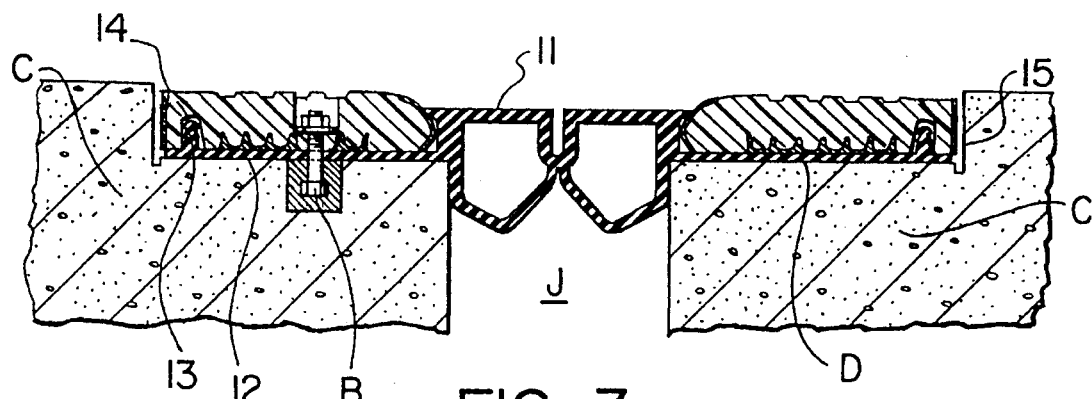
FIG. 3 is a cross-sectional view of a joint utilizing a joint seal and a joint seal retaining members according to the present invention.

Referring now to FIGS. 1, 2 and 3, an expansion joint seal retaining element is shown, in finished form, in FIG. 1. It will be understood that the retaining element shown generally at 1, is illustrated is cross-section, and may be of any desired length. Element 1 is formed as a co-extrusion of a tough durable artificial rubber body 2, made of from, e.g., SANTOPRENE™ (a product of Monsanto Company) and high or ultra high density polyethylene or polypropylene elements 3, 4 and 5. Element 3, which will be discussed in detail, is a rigid reinforcing and strengthening plate. Element 4 is a nosing that is provided for increased wear resistance and durability against, for instance, snow plow blades at the fairly exposed front edge of the retaining element. Element 5 is a rigid rear wall.

Reinforcing plate element 3 is provided with at least one, and preferably a plurality of spaced apart rib members 6 that extend upwardly into body 2 to firmly anchor body 2 to reinforcing plate 6. This anchoring is especially important because when element 1 is bolted down (as shown in FIG. 3) to secure an expansion joint seal in place, the nut with washer threaded onto anchor bolt B bears essentially against the uppermost portion of rib members 6 and thus transfers the holding down force against plate 3. It will be understood then that plate 3 must be integral with body 1. Moreover, as shown in FIG. 3, it will be noted that the bolt well that is bored into body 2 of the retaining element will extend to the uppermost level of ribs 6, or slightly above it. Since ribs 6 are made from a very rigid and strong material with low compression set characteristics, relative to the surrounding body, there will be little compression upon the tightening of the nut and washer onto threaded bolt or rod B. This creates an ability for the bolt assembly to maintain the required degree of torque applied to the nut and washer. Compression set in one area of body 2 will be counterbalanced by the rigidity of ribs 6 and plate 3 and the confinement of body 2 between the upwardly extending rib members 6.

In fabricating the retaining element 1 of the present invention with ribs 6 provided on the reinforcing plate 3, a significant difficulty that was encountered was that, due to differences in thermal expansion and viscosity during the co-extrusion process, combined with different rates of cooling after the co-extrusion process, a series of grooves and bulges, such as is shown in FIG. 2 invariably formed on the lower surface of plate 3, with a groove 8 below each rib 6, and a bulge 9 between adjacent ribs 6. Experimentation with various temperatures, thicknesses of ribs, spacing of ribs and so on failed to produce any reduction in this phenomenon.

In order to provide a retaining element that provides the benefits of ribs 6 but avoids the negative effects of bulges 9 and grooves 8, the retaining element of the present invention, after co-extrusion to provide the intermediate form shown in FIG. 2 is planed on an ordinary electrically powered woodworker's plane or other mechanical planing device, above line 10 in FIG. 2, until the lowermost surface is flat.

It is preferred, but not strictly necessary, to provide a hollow channel 7 of substantially rectangular shape in the lower surface of the retaining element, rearwardly of plate 3. Channel 7 is provided to receive an upwardly projecting dart 13 on base portion 12 of seal 11. It will be observed that dart 13 is provided with a series of outwardly extending sealing flanges 14 that compress against the walls of channel 7. Accordingly, water will not leak past dart 13 to get under seal 11. This is particularly important to prevent water from leaking under the front edge of the retaining element, in that it is desirable to provide a narrow sealant channel 15 to the outside of retaining element 1, whereby water is prevented from entering the joint at the rear edge of element 1. Engagement of dart 13 with channel 7 also serves to firmly anchor seal 11 in place against slippage into a joint.

Furthermore, if the base portion 12 of seal 11 is lightly ribbed during its extrusion process, on both the upper surface D adjacent to substrate D, then once the assembly is positioned and torqued down then the lightly ribbed surfaces will experience compression and thus act as a series of waterstops along the width of portion 12. This will prevent moisture migration due to capillarity between the mating surfaces.

Figure 4:
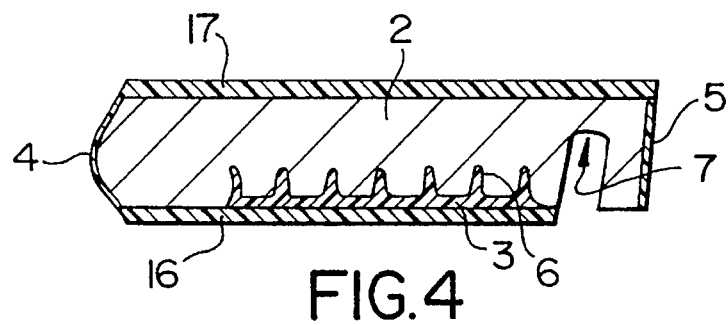
FIG. 4 is a cross -sectional view of an alternative embodiment of the member shown in FIG. 1.

Moreover, and with reference now to FIG. 4, if it is desired to obtain a joint seal retaining element with greater rigidity, thickness, or surface hardness one or more additional layers of high density or ultra high density polyethylene or polypropylene (HDPE, UHDPE, HDPP or UHDPP) may be fused by heat welding to the upper or lower surfaces of the retaining element, as required.

In the case of fusing a layer of HDPE, UHDPE, HDPP or UHDPP to the bottom surface of the element, the element is co-extruded and planed, as described above, and then brought into contact, under heat and pressure with a strip 16 of the chosen material, whereby the material fuses intimately to the bottom surface of the retaining element. It will be observed that in the case of wishing to add a layer of HDPE, UHDPE, HDPP or UHDPP to the top layer of the element, it should be extruded with a flat upper surface, rather than a ribbed upper surface. If ribbing is then required, after fusion of the strip 17 of higher density material to the SANTOPRENE™ body, the upper surface may be shaped by grooving on a jointing machine.

With regard to the lamination of a layer of high density elastomer such as polyethylene or polypropylene to the upper surface of the thermoplastic rubber SANTOPRENE™ body, the compositional nature of SANTOPRENE™ is considered a thermoplastic alloy. It is essentially a thermoplastic polypropylene gel, infused with a dense matrix of microscopic particles of vulcanized rubber. The rubber particles are typically about one micrometer in diameter. When the surface is heated in contact with the surface of a polyethylene or polypropylene layer to be bonded thereto, fusion between the two surfaces occurs quickly as the polypropylene molecules of the SANTOPRENE™ intermingle and set with the molecules of the polyethylene or polypropylene molecules of the layer to be added thereto.

It will furthermore be noted that the overall width of the joint retaining element may similarly be adjusted by the heat fusion of a strip of high density plastics material to the outside edge thereof.

A process for utilization of the present invention is as follows, with reference to the drawings:

a) Retaining elements 1 are co-extruded from SANTOPRENE™™ and High Density (or ultra high-density) Polyethylene (HDPE) including rib structures 6.

b) After being cooled the lowermost surface bulges 9 and grooves 8 of the HDPE reinforcing plate 3, are planed off to provide a flat surface.

c) Wells are countersunk into the top surface of retaining element, to about the level of the ribs; in the centre of each well, a hole is bored through to accept a threaded bolt.

d) A seal 11 is made of SANTOPRENE™ is extruded to a desired profile and width, the seal being provided with a flat and slightly ribbed base surfaces 12 on which the retaining elements will sit, and bolt holes aligned with the bolt holes in retaining element 1 are formed in the seal bases 12. The seal is profiled to fit snugly with the nose 4 of the retaining element. The seal is preferably provided with profiled sealing darts 13 to fit into channels 7 on the retaining element. This increases water resistance of the seal, and firmly anchors the seal in place.

e) A "blockout" is formed or cut at the sides of a joint J to dimensions matching those of the width of the retaining element 1 (plus a narrow sealant channel 15) and the depth of retaining element 1 plus seal base 12.

f) At spaced locations corresponding to the bolt holes in retaining element, and seal base 12, pockets are drilled out in blockout D to accommodate anchor bolts B that are inserted into an inverted position in the pockets, and grouted or epoxied in place.

g) The seal 11 is then laid over the joint, with bolts B extending through the pre-formed bolt holes therein.

h) A retaining element is then laid over each base member 12 of the seal, and a washer and nut is then threaded onto anchor bolt B to maintain the expansion joint seal in position. The bolt wells are then filled with sealant.

It will be observed that following the above detailed procedures, a portion of seal, if damaged may be readily replaced. Since the retaining elements are made of heat weldable materials, they may be cut in the field and removed without being permanently damaged, since they may be re-installed and heat welded back together, with any saw-cut kerf being filled in with melted SANTOPRENE™, or air curable silicone rubber.

It is to be understood that the examples described above are not meant to limit the scope of the present invention. It is expected that numerous variants will be obvious to the person skilled in the field of expansion joint seal design without any departure from the spirit of the invention. The appended claims, properly construed, form the only limitation upon the scope of the invention.

I claim:

1. Apparatus for spanning and sealing an expansion joint between two load bearing surfaces, said joint being a gap between two said surfaces and substantially rectangular, upward opening channels formed in said surfaces adjacent said gap, said apparatus comprising:

(a) an elongated joint seal member having a central body portion dimensioned to span said gap, and a pair of side flap members extending therefrom of a width selected to lay flat in said channels;

(b) upwardly extending darts near the outermost edges of said flap members;

(c) a pair of joint seal retaining members, of a width selected to overlie said flap members, said retaining members being provided with elongate channels on their lower surfaces to accept said upwardly extending darts on said flap members, said retaining members comprising a co-extrusion of a thermoplastic rubber body and high density polyethylene elements, wherein said high density polyethylene elements include a reinforcing plate formed on the lower surface of said body, said reinforcing plate including a plurality of upwardly extending ribs, substantially parallel to the lengthwise direction of the joint; and (d) means to fasten said joint seal retaining members in said channels whereby said joint seal is anchored in said joint.

2. Apparatus as claimed in claim 1, further comprising high density polyethylene reinforcing layer formed on an edge of said pair of retaining members, said edge facing said gap.

3. Apparatus as claimed in claim 2, further comprising a layer of high density plastic material fused to one of the upper surface and lower surface of said body.

4. Apparatus as claimed in claim 2, wherein said central body of said seal member is profiled to fit with said joint seal retaining member to present a substantially smooth upper surface for traffic.

5. Apparatus as claimed in claim 4, wherein said fastening means comprises a plurality of a bolts anchored in said channel at regular intervals and presenting an upwardly extending threaded shaft; a plurality of bolt holes in the flaps of said seal member aligned with said anchor bolts, a plurality of wells formed in the upper surface of said joint seal retaining members and including bolt holes aligned with said anchor bolts; and a plurality of nuts and washers for fastening to said threaded shafts after said joint seal members and said joint seal retaining members have been placed in aligned relationship over said threaded shafts of said anchor bolts.

* * * * *